(12) United States Patent
Jain et al.

(10) Patent No.: US 8,730,926 B2
(45) Date of Patent: May 20, 2014

(54) SYSTEM AND METHOD FOR MULTI-NETWORK COVERAGE

(75) Inventors: Nikhil Jain, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/197,091

(22) Filed: Aug. 22, 2008

(65) Prior Publication Data

US 2008/0304461 A1 Dec. 11, 2008

Related U.S. Application Data

(62) Division of application No. 11/373,082, filed on Mar. 9, 2006.

(51) Int. Cl.
*H04W 4/00* (2009.01)
(52) U.S. Cl.
USPC ...... 370/338; 455/435.2; 455/436; 455/552.1
(58) Field of Classification Search
USPC ............. 370/338; 455/435.2, 436, 552.1
See application file for complete search history.

(56) References Cited

U.S. PATENT DOCUMENTS

| | | | |
|---|---|---|---|
| 6,243,581 B1 | 6/2001 | Jawanda | |
| 6,442,150 B1 * | 8/2002 | Kondo et al. | 370/331 |
| 6,879,830 B1 * | 4/2005 | Vollmer et al. | 455/442 |
| 7,031,709 B2 | 4/2006 | Watanabe et al. | |
| 7,039,025 B1 | 5/2006 | Menon et al. | |
| 7,116,938 B2 * | 10/2006 | Monroe et al. | 455/41.2 |
| 7,177,294 B2 * | 2/2007 | Chen et al. | 370/338 |
| 7,215,660 B2 * | 5/2007 | Perlman | 370/338 |
| 7,483,411 B2 * | 1/2009 | Weinstein et al. | 370/338 |
| 7,965,230 B2 | 6/2011 | Pon | |
| 2002/0060995 A1 * | 5/2002 | Cervello et al. | 370/332 |
| 2002/0147008 A1 | 10/2002 | Kallio | |
| 2002/0155848 A1 | 10/2002 | Suryanarayana | |

(Continued)

FOREIGN PATENT DOCUMENTS

| EP | 1545146 A2 | 6/2005 |
|---|---|---|
| JP | 2002314475 A | 10/2002 |

(Continued)

OTHER PUBLICATIONS

International Search Report—PCT/US07/063666—International Search Authority—European Patent Office, Oct. 3, 2007.

(Continued)

*Primary Examiner* — Kwasi Karikari
(74) *Attorney, Agent, or Firm* — Dang M. Vo (57) ABSTRACT

A system and method are provided for a multi-network wireless communications access terminal (AT) to access multi-network coverage. The method registers a multi-network AT in a first communications network. In response to registering with the first network, the AT receives information via the first network that is required for accessing a second communications network (e.g., an IEEE 802.20 or 1xEV-DO network). The AT obtains services accessed via the second network, in response to the access information received via the first network. For example, the second network access information may be system information, channel information, or access point parameters. The AT retains the option of obtaining services accessed via the first network if the second network cannot be accessing the second network.

20 Claims, 7 Drawing Sheets

(56) References Cited

U.S. PATENT DOCUMENTS

| | | |
|---|---|---|
| 2002/0173272 A1 | 11/2002 | Liang et al. |
| 2002/0193110 A1 | 12/2002 | Julka et al. |
| 2003/0039237 A1 | 2/2003 | Forslow |
| 2003/0114158 A1 | 6/2003 | Soderbacka et al. |
| 2003/0118015 A1 | 6/2003 | Gunnarsson et al. |
| 2003/0139179 A1 | 7/2003 | Fuchs et al. |
| 2003/0147534 A1 | 8/2003 | Ablay et al. |
| 2003/0166397 A1 | 9/2003 | Aura |
| 2004/0063426 A1 | 4/2004 | Hunkeler |
| 2004/0068571 A1* | 4/2004 | Ahmavaara ............ 709/228 |
| 2004/0136318 A1 | 7/2004 | Bentley |
| 2004/0215735 A1 | 10/2004 | Nakahara et al. |
| 2004/0264422 A1* | 12/2004 | Calcev et al. ............ 370/338 |
| 2004/0266440 A1 | 12/2004 | Fuchs et al. |
| 2005/0036465 A1* | 2/2005 | Waxman et al. .......... 370/338 |
| 2005/0053043 A1 | 3/2005 | Rudolf et al. |
| 2005/0107069 A1 | 5/2005 | Vetillard |
| 2005/0136892 A1 | 6/2005 | Oesterling et al. |
| 2005/0157677 A1 | 7/2005 | Dowling |
| 2005/0163080 A1 | 7/2005 | Suh et al. |
| 2005/0227691 A1 | 10/2005 | Pecen et al. |
| 2005/0237962 A1* | 10/2005 | Upp et al. ............... 370/313 |
| 2005/0273849 A1 | 12/2005 | Araujo et al. |
| 2006/0013398 A1 | 1/2006 | Halasz et al. |
| 2006/0039332 A1 | 2/2006 | Kotzin |
| 2007/0211675 A1 | 9/2007 | Jain et al. |
| 2010/0110993 A1 | 5/2010 | Jain et al. |

FOREIGN PATENT DOCUMENTS

| | | |
|---|---|---|
| JP | 2003169379 A | 6/2003 |
| JP | 2003199171 A | 7/2003 |
| JP | 2003269109 A | 9/2003 |
| JP | 2004128917 A | 4/2004 |
| JP | 2004253961 A | 9/2004 |
| JP | 2005072980 A | 3/2005 |
| JP | 2005080197 A | 3/2005 |
| JP | 2005080199 A | 3/2005 |
| JP | 2005109850 A | 4/2005 |
| JP | 2005184824 A | 7/2005 |
| JP | 2006518975 A | 8/2006 |
| JP | 2007529920 A | 10/2007 |
| WO | WO02063900 A1 | 8/2002 |
| WO | 2004077753 | 9/2004 |
| WO | 2005089249 A2 | 9/2005 |

OTHER PUBLICATIONS

Written Opinion—PCT/US2007/063666, International Search Authority, European Patent Office, Oct. 30, 2007.

Shiao-Li Tsao, et al., "Reducing idle mode power consumption of cellular / VoWLAN dual mode mobiles", Global Telecommunications Conference, 2005. GLOBECOM '05. IEEE St. Loius, MO, USA Nov. 28-Dec. 2, 2005, Piscataway, NJ, USA,IEEE, vol. 5, Nov. 28, 2005, pp. 2902-2906, XP010879251, DOI: DOI: 10.1109/GLOCOM.2005.1578289 ISBN: 978-0-7803-941 4-8.

Partial European Search Report—EP11173667—Search Authority—The Hague—Aug. 17, 2011.

European Search Report—EP11173667—Search Authority—The Hague—Feb. 23, 2012.

European Search Report—EP12164992—Search Authority—The Hague—May 18, 2012.

* cited by examiner

SYSTEM AND METHOD FOR MULTI-NETWORK COVERAGE

CLAIM OF PRIORITY UNDER 35 U.S.C. §120

The present Application for patent is a divisional of patent application Ser. No. 11/373,082 entitled "SYSTEM AND METHOD FOR MULTI-NETWORK COVERAGE" filed Mar. 9, 2006, pending, and assigned to the assignee hereof and hereby expressly incorporated by reference herein.

FIELD

The present invention generally relates to wireless communications and, more particularly, to a multi-network system and method for accessing a first wireless communications network using information obtained from communications received via a second network.

BACKGROUND

Traffic on the Internet is growing exponentially due to an increasing number of subscribers and the introduction of new applications. Wide area wireless networks are also experiencing rapid subscriber growth. Currently, there are many efforts underway to provide data services on wireless access networks, such as IEEE 802.11 networks. However, the provision of these high bandwidth data services is not necessarily conducive to efficient battery consumption, especially if a wireless access terminal (AT) spends long periods of time in the idle state.

Other networks, such as the 1xEV-DO Code Division Multiple Access (CDMA) wireless phone networks, with low bandwidth data rates, are optimized for paging services, supporting long idle and rapid page response times. ATs operating in these paging-optimized networks consume a minimum of battery power.

As the high data rate networks expand, more network coverage overlap is occurring with the above-mentioned paging-optimized networks. Concurrently, multi-mode ATs are entering the market that are able to communicate in both types of networks. While a multi-mode AT has the convenience of being able to communicate in either type of network, the battery consumption problem still exists if the AT is used to "camp" on the high data rate network.

It would be advantageous if an multi-network AT could seamlessly make use of the advantages offered by both paging-optimized and high data rate networks by camping on the paging-optimized network, and accessing the high data rate network only when data communications are required.

It would be advantageous if overlapping networks could cooperate, with the paging-optimized network providing high data rate network access information for any monitoring multi-network AT.

SUMMARY

To address the above-mentioned problems, a wireless communications multi-network AT is presented that can be registered in a first network, and collect information needed to access a second network, when the need arises. That is, the AT is able to obtain access information for the second network without registering in, or monitoring the second network. Likewise, the first network access point (AP) cooperates by detecting the presence of a second network AP and collects information that is needed for accessing the second network AP. The first network AP can broadcast the second network access information via the first network, or supply the access information to an AT upon request.

Accordingly, a method is provided for a multi-network wireless communications AT to access multi-network coverage. The method registers a multi-network AT in a first communications network. In response to registering with the first network, the AT receives information via the first network that is required for accessing a second communications network (e.g., an IEEE 802.20, 802.16e, or 1xEV-DO network). The AT obtains services accessed via the second network, in response to the access information received via the first network. For example, the second network access information may be system information, channel information, or access point parameters.

The AT retains the option of obtaining services accessed via the first network if the AT cannot access the second network. For example, the AT may fail to receive the second network access information, or the access information may be outdated. Alternately, the AT may fail to receive second network services as a result of inadequate second network wireless coverage.

If the first network AP does not broadcast the second network access information, the AT may periodically monitor the second network band to detect the presence of the second network. If the second network is detected, the AT requests the access information from the first network AP.

In another aspect, a method is provided for a communications network AP to supply wireless communications multi-network coverage. The method provides a first communications network AP. A second communications network AP detects the presence of the first network AP, and ceases to broadcast access information in response to detecting the first network AP. The first network AP detects the presence of the second network AP and advertises the availability of the second network AP by broadcasting the information, or supplying the information to ATs upon request.

Additional details of the above-described methods, a multi-network AT for accessing multi-network coverage, and a system for providing multi-network coverage are provided below.

BRIEF DESCRIPTION OF THE DRAWINGS

FIG. 8 is a flowchart illustrating a method for accessing multi-network coverage in a multi-network wireless communications AT.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Figure 1:
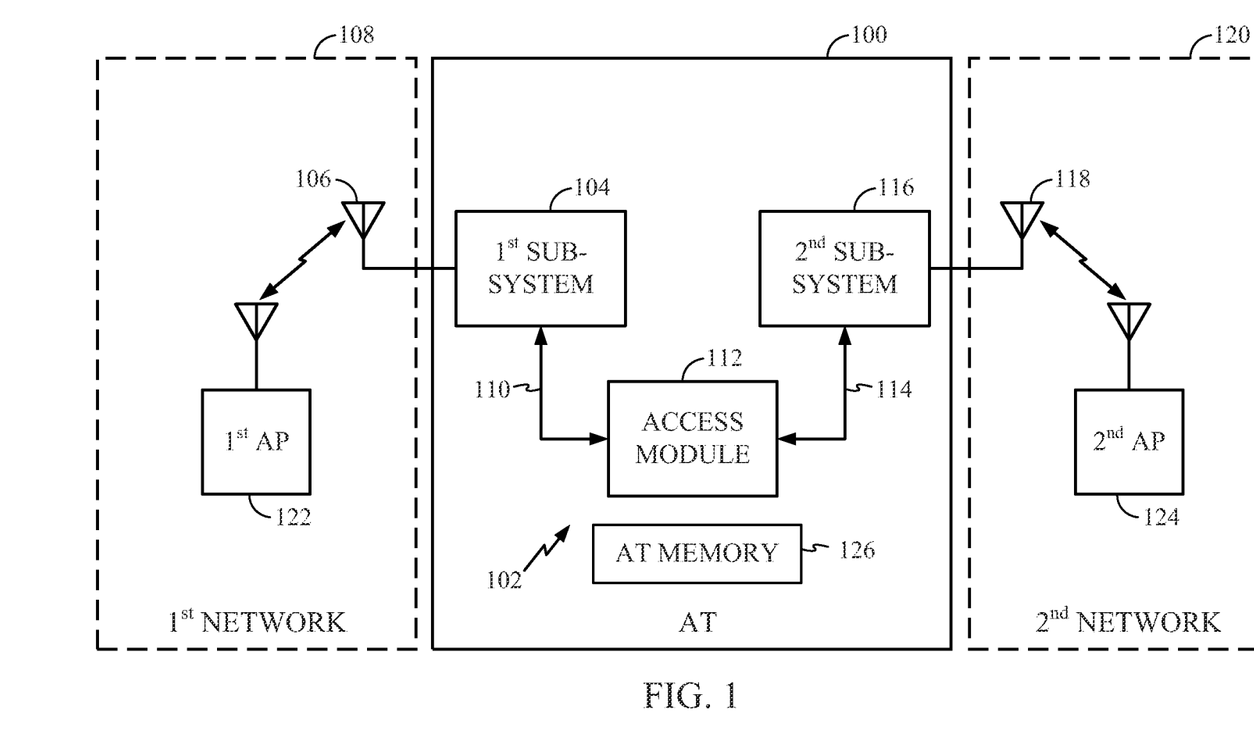
FIG. 1 is a schematic block diagram of a multi-network wireless communications access terminal (AT) with a system for accessing multi-network coverage.

FIG. 1 is a schematic block diagram of a multi-network wireless communications access terminal (AT) 100 with a system for accessing multi-network coverage. The system 102 comprises a first communications subsystem 104 having a wireless interface, represented by antenna 106, for registering the AT 100 in a first communications network 108. The first subsystem 104 typically includes a wireless transceiver (not shown) with frequency translation, de/modulation, and baseband processing circuitry. The subsystem 104 has an interface on line 110 to supply access information received for a second communications network. For example, the first subsystem 104 may be a 1xEV-DO CDMA, a Global System for Mobile Communications (GSM), or a Universal Mobile Telecommunications System (UMTS) subsystem. The first subsystem 104 is not limited to any particular wireless communications protocol, however, for the purposes of this example it is assumed that the first subsystem is a paging-optimized network, which typically has a large coverage area.

An access module 112 has an interface on line 110 to receive access information from the first subsystem 104. The access module 112 has an interface on line 114 to supply the received access information. A second communications subsystem 116 has a wireless interface, represented by antenna 118, for obtaining services accessed via the second network 120. The second subsystem 116 uses only the access information received via the interface connected on line 114 to register with, and receive services from the second network 120. That is, the second subsystem 116 does not initially rely upon access information previously stored in memory, although the information once obtained, may be stored for later use. Although the second subsystem 116 is not limited to any particular communication protocol, for the purposes of this example it is assumed that the second subsystem is a high data rate system, such as those compliant with IEEE 808.20 or IEEE 802.16e, or those compliant with wireless telephone standards such as DO. Generally, the second network is a network that can only be accessed by an AT using some auxiliary information. That is, the AT must acquire some control channel information before it can engage in a network registration process. This process reduces the amount of overhead information that is broadcast, and permits ad hoc network deployments. Again, the second subsystem 116 is typically a transceiver with frequency conversion, de/modulation, and baseband processing circuitry.

In one aspect, the first subsystem 104 receives access information for the second network 120 such as system information, channel information, and access point parameters. As used herein, system information refers to basic system access information, such as the mode and layout of the OSI model physical layer, which may be common to a number of APs. For example, in Orthogonal Frequency Division Multiplexing (OFDM) the system information may include the cyclic prefix length, the number of guard carriers, and the interlace structure. Channel information conveys information for a specific channel to be used by an AT. In OFDM for example, the channel information may include channel hopping information, control channel timing, pilot information, and antenna information for a particular channel. Access point parameters convey information for a specific AP. For example, AP parameters may include AP ID, GPS information, and neighbors for a particular AP.

If the second subsystem 116 fails to access to the second network 120, it sends an access failure notice to the access module 112 on line 114. The access module 112 sends an access acquire command to the first subsystem on line 110 in response to receiving the access failure notice. Then, the first subsystem 104 accesses services via the first network 108 in response to the access acquire command. Note, the first network 108 may not be able to supply all the services that are nominally available via the second network 120, and the second network may not be able to supply all the services available via the first network. The second subsystem 116 is unable to access (register and/or receive services) the second network 120, if it fails to receive access information for the second network. For example, the first network 108 may be unable to supply second network access information, or the information may obsolete or incorrect. The second subsystem 116 may also fail to receive second network wireless coverage. That is, the second subsystem 116 may be blocked or too far away to communicate with APs in the second network 120.

In another aspect, the second subsystem 116 may detect the presence of the second network 120 and send a detection notice to the access module 112 on line 114. For example, the second subsystem 116 may periodically awaken, or awaken in response to triggering events. The access module 112 sends a request command to the first subsystem 104 on line 110 in response to receiving the detection notice. Then, the first subsystem 104 requests access information for the second network 120, from a first network access point (AP) 122, in response to the request command. The first subsystem 104 receives access information for the second network 120 from the first network AP 122, in response to the request.

The above-mentioned detection mechanism is useful if the AT misses an access information broadcast from the first network AP 122, or if the first network AP only supplies second network access information upon request. In one aspect, the second subsystem 116 detects an identifier (ID) for an AP 124 in the second network 120 and the first subsystem 104 requests access information for the second network 120 using the second network AP 124 identifier (ID) in the request.

In another aspect, the first subsystem wireless interface 106 receives second network paging messages from a first network AP 122. The AT 100 may not need access information for the second network, for example, if the access information is stored in AT memory 126, or if the second subsystem 116 is operating in a sleep mode. Then, the AT is able to minimize battery consumption by receiving the second network pages via the first network, which enable the AT 100 to register in the second network 120, at the convenience of the AT. It should be understood that the AT is typically a mobile device. As such, the AT may acquire different AP's within the first and second networks as it moves. Further, if one network (i.e., the first network) has a wider coverage area, the AT may acquire different APs in the second network, even if it need not acquire a different AP in the first network. It should be understood that while the components of system 102 are logically distinct, in the actual physical implementation of the system these components may be enabled with the same hardware. For example, the two networks 108 and 120 may both be DO networks operating at different frequencies, so that subsystems 104 and 116 can be enabled using the same circuitry in an AT.

Figure 2:
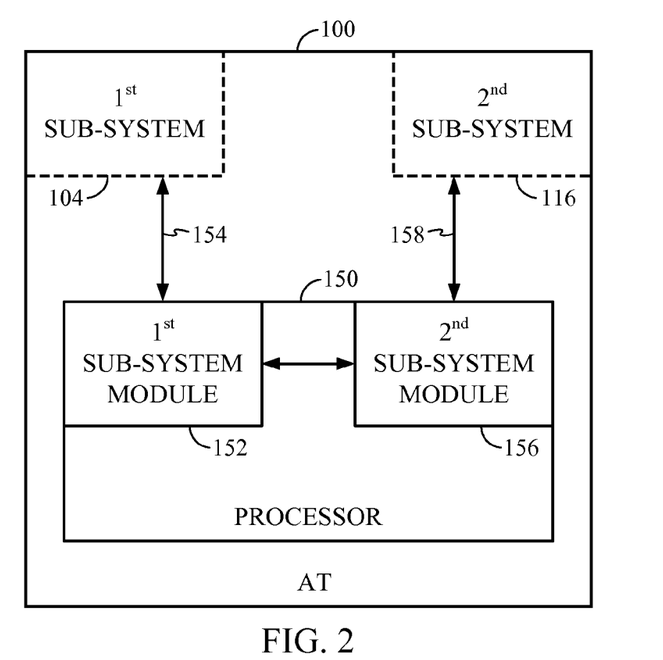
FIG. 2 is a schematic block diagram depicting a multi-network wireless communications AT with a processor device for accessing multi-network coverage.

FIG. 2 is a schematic block diagram depicting a multi-network wireless communications AT 100 with a processor device for accessing multi-network coverage. The processor device 150 comprises a first communications subsystem module 152 with an interface on line 154 for registering the AT 100 in a first communications network. The first subsystem module 152 also receives access information for a second communications network. A second communications subsystem module 156 has an interface on line 158 for obtaining services accessed via the second network, using the second network access information received via the first subsystem module 152. In some aspects, the processor device of FIG. 2 is the same as the access module of FIG. 1.

Figure 3:
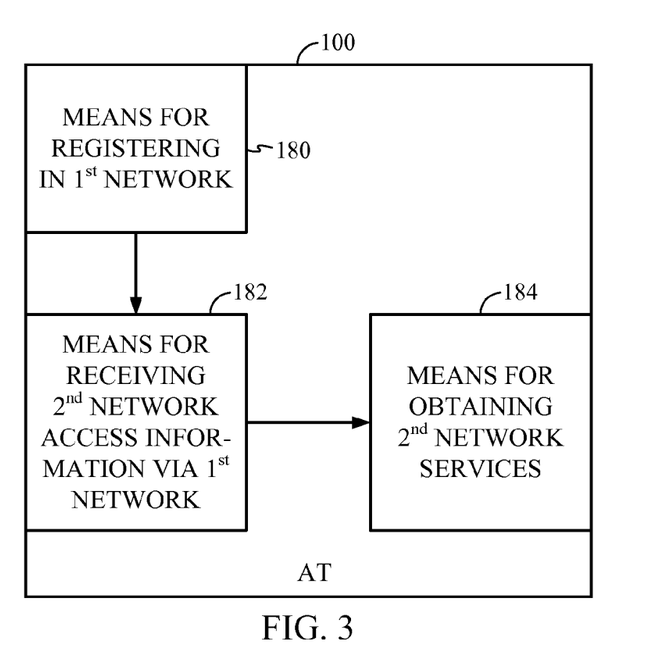
FIG. 3 is a block diagram depicting a multi-network AT capable of accessing multi-network coverage.

FIG. 3 is a block diagram depicting a multi-network AT capable of accessing multi-network coverage. The AT 100 comprises a means 180 for registering a multi-network AT 100 in a first communications network 108. The AT 100 comprises a means 182 for receiving access information for a second communications network via the first network, in response to registering with the first network. In addition, the AT 100 includes a means 184 for obtaining services accessed via the second network, in response to access information received via the first network.

Figure 4:
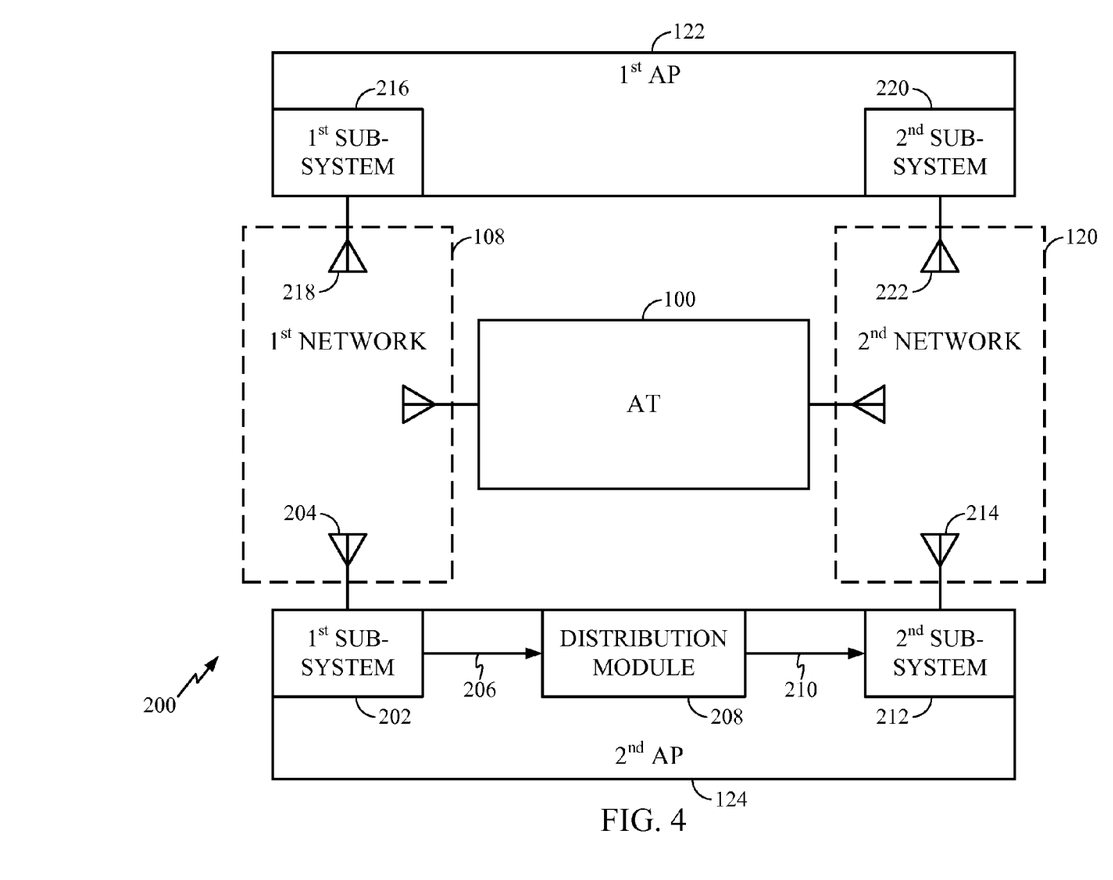
FIG. 4 is a schematic block diagram of a system for providing wireless communications multi-network coverage.

FIG. 4 is a schematic block diagram of a system for providing wireless communications multi-network coverage. The system 200 comprises a second access point (AP) 124. The second AP 124 includes a first communications subsystem 202 with a wireless interface, represented by antenna 204, for detecting the presence of the first AP 122 operating in the first communications network 108. The first subsystem 202 has an interface on line 206 for supplying detection information. The first subsystem 202 typically includes a wireless transceiver (not shown) with frequency translation, de/modulation, and baseband processing circuitry. For example, the first subsystem 202 may be a 1x CDMA, a GSM, or a UMTS base station. The first subsystem 202 is not limited to any particular wireless communications protocol, however, for the purposes of this example it is assumed that the first subsystem is paging-optimized network, which typically covers a large geographic area. In one aspect, the second AP 124 is able to detect the first AP without the use of the first subsystem 202, in which case the second AP 124 may be equipped with only a second subsystem (described below).

A distribution module 208 has an interface on line 206 to receive the detection information and an interface on line 210 to supply a cease-broadcast command. A second communications subsystem 212 has a wireless interface, represented by antenna 214, that ceases the broadcast of second communications network access information in response to receiving the cease-broadcast command via the interface connected to the distribution module 208 on line 210. Although the second subsystem 212 is not limited to any particular communication protocol, for the purposes of this example it is assumed that the second subsystem is a high data rate system, such as those compliant with IEEE 808.20, or IEEE 802.16e, or other wireless standards such as DO. Again, the second subsystem 212 is typically a transceiver with frequency conversion, de/modulation, and baseband processing circuitry. Although the second AP 124 may include both first and second subsystems, so that it is able to communicate in both the first and second networks, for the purposes of this analysis the second AP 124 is assumed to be primarily associated with second network 120. That is, the second AP 124 may be referred to as a second network AP.

The first AP 122 likewise includes a first communication subsystem 216 with a wireless interface, represented by antenna 218, for supplying second network access information in the first network. The access information may be system information, channel information, or access point parameters. The first AP 122 detects the presence of the second AP 124 using a second communications network subsystem 220 and wireless interface 222. Alternately, the first AP 122 may not have a second subsystem, but receive the detection information by some other wireless or wired communication channel (e.g., LAN), not shown. Then, the first AP 122 advertises the availability of the second AP 124 via the first subsystem 216. Although the first AP 122 may include both first and second subsystems, so that it is able to communicate in both the first and second networks, for the purposes of this analysis the first AP 122 is assumed to be primarily associated with first network 108. That is, the first AP 122 may be referred to as a first network AP.

In one aspect, the second AP 124 supplies second network access information to the first AP. The access information can be passed between APs via the first network 108, the second network 120, or through a wired connection (not shown). In one aspect, the first AP 122 broadcasts the access information supplied by the second AP 124 via the first subsystem wireless interface 218. In another aspect, the first AP 122 only broadcasts the presence of the second AP 124, for example an identifier for AP 124, and the AT 100 may request further access information for AP 124 by accessing AP 122 via the first subsystem wireless interface 218. In yet another aspect, AP 124 broadcasts an identifier that the AT 100 uses in its request for information about AP 124, when it accesses AP 122. In this aspect, the AP 122 mayor may not be aware that the AT 100 is accessing it to request information about AP 124, and may not even be aware of the presence of AP 124. For example, the AT 100 may use a layer 2 tunneling protocol (L2TP) to access AP 124 using the identifier broadcast by AP 124, and AP 124 may supply the second network access information to the AT 100 via the first AP 122 in a message encapsulated using the same L2TP. In this case, the messages appear as an IP packet flow to AP 122. In another aspect, the AT 100 may use specified layer 2 signaling with AP 122 to acquire the access information.

Independent of the access information, the first AP 122 may broadcast a paging message via the first subsystem wireless interface 218. In this manner, the second AP 124 is able to register AT 100 via the second subsystem wireless interface 214 in response to the paging message.

Figure 5:
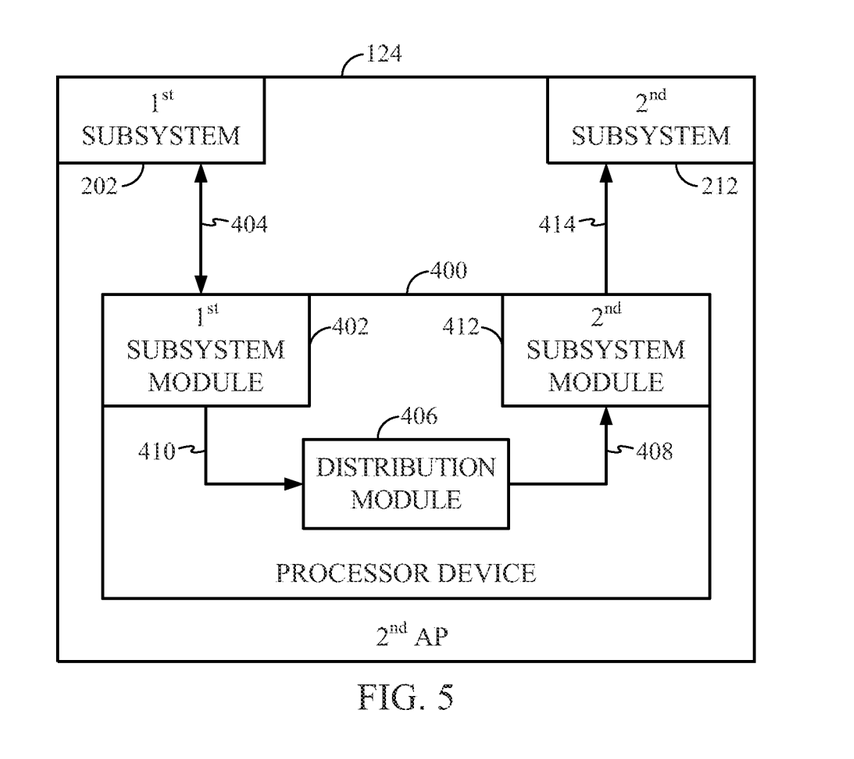
FIG. 5 is a schematic block diagram of a communications network access point (AP) with a processor device for providing wireless communications multi-network coverage.

FIG. 5 is a schematic block diagram of a communications network access point (AP) 124 with a processor device for providing wireless communications multi-network coverage. The processor device 400 comprises a first communications subsystem module 402 with an interface on line 404 for receiving a signal indicating the detection of a first communications network AP (not shown, see first AT 122 in FIG. 4).

A distribution module 406 supplies a cease-broadcast command on line 408 in response to the detection of the first network AP, received in a signal from first subsystem module 402 on line 410. A second communications subsystem module 412 has an interface on line 414 that supplies a signal that ceases the broadcast of second communications network access information in response to the cease-broadcast command received on line 408. In some aspects, the processor device 400 is the same as the distribution module shown in FIG. 4.

Figure 6:
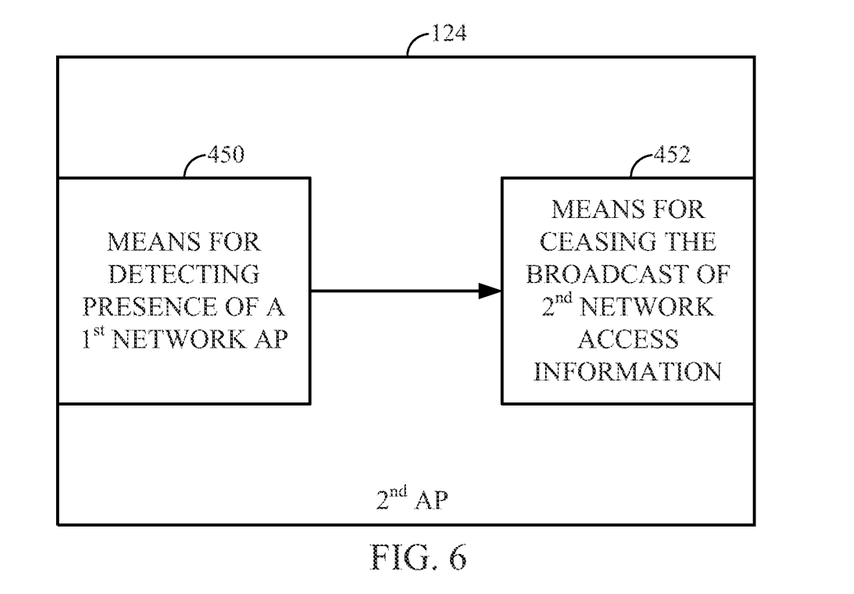
FIG. 6 is a block diagram depicting a communications network AP providing wireless communications multi-network coverage.

FIG. 6 is a block diagram depicting a communications network AP providing wireless communications multi-network coverage. The AP (i.e., the second AP 124 of FIG. 4) comprises a means 450 for a second communications network AP to detect the presence of a first communications network AP. The AP further comprises a means 452 for the second network AP to cease broadcasting access information in response to detecting the first network AP.

Functional Description

The invention described in FIGS. 1 through 6 can be used to efficiently manage paging and overhead channels. When a first network is present, the second network may not broadcast paging channel or overhead messages. The AT only listens to first network for information concerning the second network. The second network is configured, based on AT capabilities and policy, to support this mode of paging. That is, the AT "knows" that it is being paged on the first network, but expects the access to come on the second network. Additionally, the second network need not broadcast paging and access information if the first network is present.

Alternatively, AT may specifically register with the first network to receive second network pages and access information. This mode of operation yields a more efficient version of the paging than is performed when only the second network is available to page the AT.

As a fallback, the AT may still access the first network for services if it fails to receive second network access information, or if it is not in a coverage area of the second network. The first network may inform the second network of the registration. In a different aspect, the AT registers in the first network and the second network separately, where the registration in the second network includes an indication to send pages through the first network. For example, the AT may provide an IP address or a similar identifier that is reachable via routing in the first network, and through which the second network can address page packets. The first network delivers any received packet from the second network, by paging the AT on the first network. The first network may be unaware that the purpose of the packet is specifically for paging the AT on the second network.

A minimal number of overhead messages (i.e., pages and access information) need be broadcast on second network control channels if the first network is present. This reduced overhead minimizes control channel interference from adjacent AP's. Only enough information to identify the second network AP, and dynamic parameters required for access, need be broadcast. Neighbor lists, modes of operation, power control information, and the like may only be available via unicast access of the second network AP, or via the first network. The AT may access first network to find access parameters for the second network prior to receiving a page. On a page, the AT can immediately access either first or second network, depending on coverage.

Signaling becomes a concern when multiple technologies must communicate with each other. Signaling originating at the network for a radio access technology (RAT) may be managed in two ways. A first RAT may send signaling messages via a second RAT, using a tunnel to encapsulate the message, for example, L2TP (RFC 3931) for layer 2 signaling. The message may arrive at a Home Agent (HA), if mobile IP is used, which forwards the signaling as IP packets. Alternatively, an IP, or some equivalent global address of the AT known by the first RAT, can also be used as the destination address for the packets. In one aspect, signaling for a RAT is only sent when the AT accesses that particular RAT network. In a different aspect, layer 2 signaling via another RAT originating at the AT may be used. For example, the AT may send L2TP over a DO (first) network, to talk to a WiFi (second network) access point.

The general inter-working between the two networks requires that the second network detect the presence of the first network, and to decide which overhead and paging functions it will continue to perform. Similarly, the first network may be configured to advertise the presence of the second network. The first network may also perform load balancing and efficient handoff with the second network.

The systems described in FIGS. 1 through 6 may be arranged to support an arrangement of networks, where the AT is able to communicate in different networks having complementary strengths. For example, the AT may be registered with an HA for a number of networks, to receive data simultaneously over multiple RATs, for the purpose of redundancy. Alternately, the AT may use one network (e.g., a cellular network) for paging, and a different network (e.g., a wireless LAN) for packet forwarding. In one aspect, the HA manages the use of networks using a predetermined policy. In a different aspect, the AT uses messaging to manage network use, and to configure the HA device. Further, the HA may also be configured to dynamically update how and where packets are sent, based on data traffic received from the AT. For example, paging through a first network may occur as a result of data packets being received at the HA.

The AT may be configured for listening to only a first network for paging. When a page is received, the AT may access the network on which it was paged, access another network, or access multiple networks simultaneously (for redundancy). The HA may be configured differently, based on AT capabilities and policy, to support each mode of access.

With respect to handoffs, the HA may be configured to forward a packet to multiple RAT networks. A multi-network AT may simultaneously download from two RAT networks during handoff. The AT may switch to a destination network, once the same packet is received from both networks, or it may switch when it receives a message from the HA in the data stream.

Figure 7:
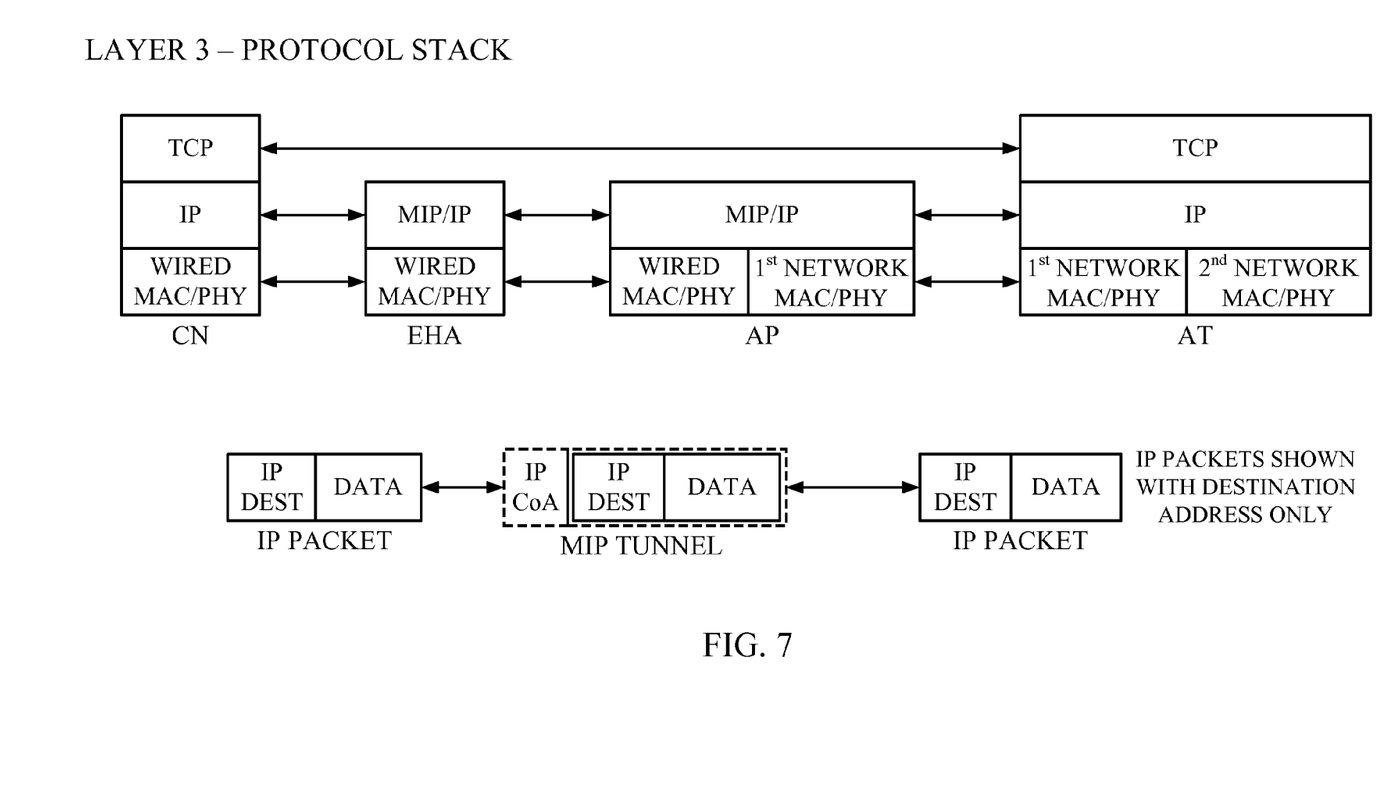
FIG. 7 is a diagram depicting a variation of a mobile IP (MIP) addressing protocol stack.

FIG. 7 is a diagram depicting a variation of a mobile IP (MIP) addressing protocol stack. In this figure, a mobile node (MN) is located at the AP. A MIP tunnel is created between the HA and the AP (MN) in the first network. Although not specifically shown, the second network has an equivalent protocol stack, with the AT using the second network MAC/PHY access layers.

Figure 8:
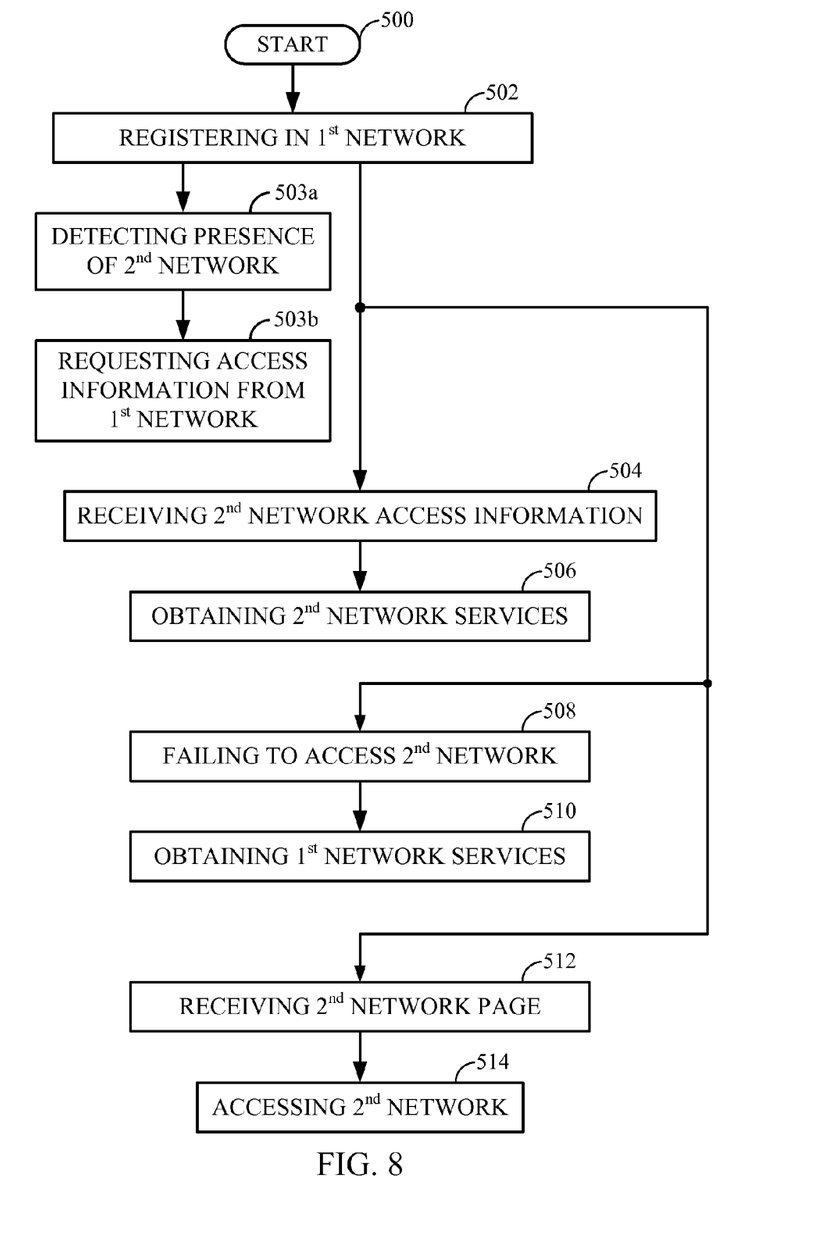

FIG. 8 is a flowchart illustrating a method for accessing multi-network coverage in a multi-network wireless communications AT. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

Step 502 registers a multi-network AT in a first communications network. Step 504 receives information via the first network that is required for accessing a second communications network, in response to registering with the first network. The access information can be system information, channel information, or access point parameters. Step 506 obtains services accessed via the second network, in response to the access information received via the first network.

In one aspect, Step 508 fails to access the second network. Then, in Step 510 the AT obtains services accessed via the first network in response to not accessing the second network. For example, the AT may fail to access the second network in Step 508 as a result of failing to receive access information for the second network, or failing to receive (adequate) second network wireless coverage.

In one aspect, the AT (Step 503a) detects the presence of the second network. In Step 503b the AT requests access information for the second network, from a first network AP (see first AP 122 in FIG. 4). Then, receiving access information for the second network in Step 504 includes the AT receiving second network access information from the first network AP, in response to the request. For example, In Step 503a the AT may detect an identifier for an AP in the second network (second AP 124 in FIG. 4). Then, requesting access information for the second network in Step 503b includes the AT using the second network AP identifier in the request.

In another aspect, the AT receives a second network paging message via the first network in Step 512. In Step 514 the AT accesses the second network in response to receiving the paging message.

Alternately, the flowchart of FIG. 8 may be understood to represent a signal bearing medium tangibly embodying a program of machine-readable instructions executable by a digital processing apparatus to perform operations for accessing multi-network coverage in a multi-network wireless communications AT.

Figure 9:
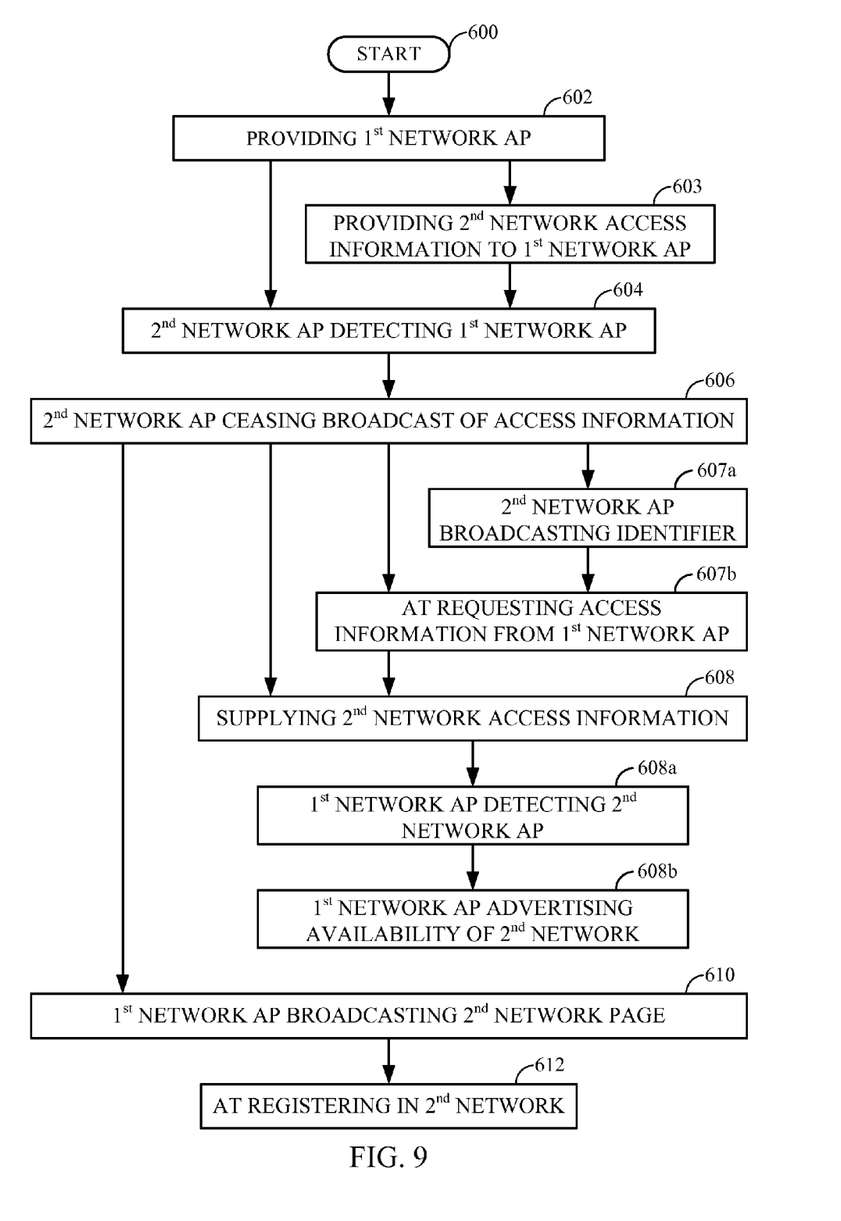
FIG. 9 is a flowchart depicting a method for providing wireless communications multi-network coverage in a communications network AP.

FIG. 9 is a flowchart depicting a method for providing wireless communications multi-network coverage in a communications network AP. The method starts at Step 600. Step 602 provides a first communications network AP. In Step 604 a second communications network AP detects the presence of the first network AP. In Step 606 the second network AP ceases to broadcast access information in response to detecting the first network AP. In Step 608 the first network AP supplies second network access information, such as system information, channel information, and access point parameters.

In one aspect, supplying second network access information in Step 608 includes substeps. In Step 608a the first network AP detects the presence of the second network AP. In Step 608b the first network AP advertises the availability of the second network AP.

In one aspect, the second network AP provides second network access information to the first network AP in Step 603. For example, the second network AP sends a message to the first network AP, encapsulated for layer 2 signaling. Then, in Step 608 the first network AP supplies the access information provided by the second network AP. In another aspect, the first network AP receives a request for second network access information from an AT in Step 607b. Then, in Step 608 the first network AP supplies second network access information in response to the request. In a different aspect, the second network AP broadcasts an AP identifier in Step 607a and in Step 607b the first network AP receives a request for access information for the second network AP referenced with the AP identifier.

In another aspect, the first network AP broadcasts a paging message for the second network AP in Step 610. In Step 612 an AT registers with the second network AP in response to receiving the paging message.

Alternately, FIG. 9 may be seen as representing a signal bearing medium tangibly embodying a program of machine-readable instructions executable by a digital processing apparatus to perform operations for providing wireless communications multi-network coverage in a communications network AP.

Systems and methods have been provided for an AT to access multi-network coverage. The invention permits an AT to enjoy all the services associated with multi-network coverage, while minimizing battery consumption and control channel communications. Examples of particular communication sequences and uses for the invention have been provided as illustrations. However, the invention is not limited to merely these examples. Other variations and embodiments of the invention will occur to those skilled in the art.

The invention claimed is:

1. A method for providing wireless communications multi-network coverage, the method comprising:
   detecting, by a second communications network access point (AP), presence of a first communications network AP operating in a first communications network, the second communications network AP operating in a second communications network, the second communications network AP broadcasting access information of the second communications network in the second communications network;
   communicating, by the second communications network AP, the access information to the first communications network AP;
   ceasing, by the second communications network AP, the broadcasting of the access information in the second communications network in response to detecting the first communications network AP; and
   communicating, by the second communications network AP, with an access terminal in the second communications network based on receipt of the access information from the access terminal, wherein the access terminal received the access information from the first communications network AP.

2. The method of claim 1 wherein the second communications network AP communicating the access information to the first communications network AP includes the second communications network AP sending a message to the first communications network AP, the message being encapsulated for layer 2 signaling.

3. The method of claim 1 wherein the access information is selected from a group consisting of system information, channel information and access point parameters.

4. The method of claim 1 further comprising:
broadcasting, by the second communications network AP, an AP identifier to be used by the access terminal for requesting the access information from the first communications network AP.

5. The method of claim 1 wherein the detection of the presence comprises receiving a signal from the first communications network AP.

6. The method of claim 1 wherein:
the broadcasting of the access information comprises broadcasting the access information via a wireless transceiver; and
the communicating with the access terminal comprises communicating via the wireless transceiver.

7. An apparatus for wireless communications, the apparatus operating in a first communications network, comprising:
a first communications subsystem with a wireless interface for detecting presence of an access point (AP) operating in a second communications network, the first communications subsystem being configured to supply detection information in response to detecting the presence of the AP, the first communications subsystem being further configured to communicate access information of the first communications network to the AP;
a distribution module configured to receive the detection information from the first communications subsystem and further configured to supply a cease-broadcast command in response to receiving the detection information; and
a second communications subsystem configured to receive the cease-broadcast command from the distribution module, and having a wireless interface for broadcasting the access information in the first communications network, the wireless interface being configured to cease the broadcasting of the access information in the first communication network in response to receiving the cease-broadcast command, the second communications subsystem being configured to communicate with an access terminal in the first communications network based on receipt of the access information from the access terminal, wherein the access terminal received the access information from the AP.

8. The apparatus of claim 7 wherein the first communications subsystem communicates the access information to the AP in a message, the message being encapsulated for layer 2 signaling.

9. The apparatus of claim 7 wherein the access information is selected from a group consisting of system information, channel information and access point parameters.

10. The apparatus of claim 7 wherein the wireless interface for broadcasting the access information in the first communications network is further configured to:
broadcast an AP identifier to be used by the access terminal for requesting the access information from the AP.

11. The apparatus of claim 7 wherein the detection of the presence comprises receiving a signal from the AP.

12. The apparatus of claim 7 wherein:
the wireless interface for broadcasting the access information comprises a wireless transceiver; and
the communicating with the access terminal comprises communicating via the wireless transceiver.

13. An apparatus operating in a first communications network, the apparatus comprising:
means for detecting presence of a communications network access point (AP) operating in a second communications network;
means for broadcasting access information of the first communications network in the first communications network;
means for communicating the access information to the communications network AP;
means for ceasing the broadcasting of the access information in the first communications network in response to detecting the communications network AP; and
means for communicating with an access terminal in the first communication network based on receipt of the access information from the access terminal, wherein the access terminal received the access information from the communications network AP.

14. The apparatus of claim 13 wherein the means for communicating the access information to the communications network AP communicates the access information to the communications network AP in a message, the message being encapsulated for layer 2 signaling.

15. The apparatus of claim 13 wherein the access information is selected from a group consisting of system information, channel information and access point parameters.

16. The apparatus of claim 13 wherein the means for broadcasting is configured to:
broadcast an AP identifier to be used by the access terminal for requesting the access information from the communications network AP.

17. The apparatus of claim 13 wherein:
the means for broadcasting access information and the means for communicating with the access terminal comprise a wireless transceiver.

18. A computer-readable medium encoded with instructions executable to perform operations for providing wireless communications multi-network coverage, the operations comprising:
detecting, by a second communications network access point (AP), presence of a first communications network AP operating in a first communications network, the second communications network access point (AP) operating in a second communications network, the second communications network AP broadcasting access information of the second communications network in the second communications network;
communicating, by the second communications network AP, the access information to the first communications network AP;
ceasing, by the second communications network AP, the broadcasting of the access information in the second communications network in response to detecting the first communications network AP; and
communicating, by the second communications network AP, with an access terminal in the second communications network based on receipt of the access information from the access terminal, wherein the access terminal received the access information from the first communications network AP.

19. The computer-readable storage medium of claim 18 wherein the second communications network AP communicating the access information to the first communications network AP includes the second communications network AP sending a message to the first communications network AP, the message being encapsulated for layer 2 signaling.

20. An access point (AP), the AP operating in a first communications network, comprising:
an antenna;

a first communications subsystem with a wireless interface for detecting presence of another AP operating in a second communications network, the first communications subsystem being configured to supply detection information in response to detecting the presence of the other AP, the first communications subsystem being further configured to communicate access information of the first communications network to the other AP via the antenna;

a distribution module configured to receive the detection information from the first communications subsystem and further configured to supply a cease-broadcast command in response to receiving the detection information; and a second communications subsystem configured to receive the cease-broadcast command from the distribution module, and having a wireless interface for broadcasting the access information in the first communications network, the wireless interface being configured to cease the broadcasting of the access information, via the antenna, in the first communications network in response to receiving the cease-broadcast command, the second communications subsystem being configured to communicate with an access terminal in the first communications network based on receipt of the access information from the access terminal, wherein the access terminal received the access information from the other AP.

* * * * *